United States Patent [19]
Debbas

[11] 3,991,244
[45] Nov. 9, 1976

[54] NONWOVEN POLYPROPYLENE FABRIC

[75] Inventor: Samir Costandi Debbas, Hendersonville, Tenn.

[73] Assignee: E. I. Du Pont de Nemours and Company, Wilmington, Del.

[22] Filed: July 8, 1975

[21] Appl. No.: 594,057

Related U.S. Application Data

[63] Continuation-in-part of Ser. No. 482,569, June 24, 1974, abandoned.

[52] U.S. Cl. .............................. 428/113; 428/286; 428/296; 428/298
[51] Int. Cl.² ..................... B32B 5/12; B32B 27/00; D04H 1/04
[58] Field of Search .......... 428/113, 114, 286, 298, 428/303, 296

[56] References Cited
UNITED STATES PATENTS

| | | | |
|---|---|---|---|
| 3,477,103 | 11/1969 | Troth | 19/163 |
| 3,563,838 | 2/1971 | Edwards | 428/107 |
| 3,821,062 | 6/1974 | Henderson | 428/113 |

FOREIGN PATENTS OR APPLICATIONS 1,244,753  9/1971  United Kingdom

*Primary Examiner*—Lorraine T. Kendell

[57] ABSTRACT

A length of layered nonwoven bonded continuous filament isotactic polypropylene fabric for use in preparating cut pile tufted carpets having a high tufted tongue tear strength, low fuzz buildup on beck dyeing and high optical cover at relatively low basis weight.

3 Claims, 3 Drawing Figures

NONWOVEN POLYPROPYLENE FABRIC

CROSS-REFERENCE TO RELATED APPLICATION

This application is a continuation-in-part of my application Ser. No. 482,569, filed June 24, 1974, and now abandoned.

BACKGROUND OF THE INVENTION

This invention provides an improved nonwoven primary carpet backing for use in preparing cut pile tufted carpets.

In the preparation of cut pile tufted carpets, the looper pulls the loop off of the needle during each stroke of the machine, thereby causing through abrasion an unwanted sharp edge and/or barb on the needle. The damaged needle thereafter tends to cut the primary carpet backing as the backing moves forward against the needle. This results in lower tufted tongue tear strength when nonwoven backings are employed.

Another problem with some nonwoven primary carpet backings is the tendency to develop fuzz. During beck dyeing of carpet, filaments tend to be pulled out of the nonwoven backing. Loose face yarn becomes tangled in these free filaments, forming unsightly balls of fiber on the edges and back of the carpets. These balls also create areas of poor delamination resistance in carpets when the usual secondary backing is applied.

Edwards, U.S. Pat. No. 3,563,838, teaches a method for preparing nonwoven polypropylene primary carpet backings with high tufted tongue tear strength and low neckdown in beck dyeing. This is accomplished through layering of the nonwoven material with filaments in one layer (the M layer) organized primarily in the machine direction, i.e., the general direction of belt travel, and filaments in an adjacent layer (the X layer) organized primarily in a direction across the width of the belt. The product of Edwards contains also a smaller proportion of filaments organized in the bias directions. The layered nonwoven webs of Edwards when bonded in saturated steam have high tufted tongue tear strength at a low level of neckdown. Edwards discloses sheets with both MX and MXM layer sequence.

U.S. Pat. No. 3,821,062 discloses a nonwoven polypropylene primary carpet backing which differs from the product in Edwards, U.S. Pat. No. 3,563,838, in a number of respects including binder content, matrix filament denier, tenacity and component distribution. This technology produces nonwoven MX sheets having a high level of unlatexed tear strength at a reasonable level of neckdown and which retain a high proportion of this tear resistance even after latexing.

Petersen, U.S. Pat. No. 3,502,538 discloses a nonwoven carpet backing which contains before bonding both amorphous polypropylene filaments and crystalline polypropylene filaments, the degree of crystallinity being controlled by the degree of drawing before deposit on the collecting belt. Petersen reports that a randomly-laid nonwoven carpet backing of mixed filament composition has less sensitivity to damaged (burred) needles than webs of single composition.

The present invention not only deals with the problem of damage caused by tufting with burred needles but is also concerned with fuzz resistance and high cover. In developing nonwoven carpet backings for use in cut pile carpets it has become apparent that this combination of properties is exceptionally difficult to obtain.

SUMMARY OF THE INVENTION

The product of the invention is a length of layered nonwoven thermally bonded continuous filament isotactic polypropylene fabric comprising a machine direction layer, M, at each surface of the fabric with each M layer constituting from 20–30% of the fabric weight, and a cross-machine direction layer, X, located between the M layers and which constitutes from 40–60% of the fabric weight, each of the said layers consisting essentially of 65 to 90% by weight of matrix filaments and 10 to 35% by weight of binder, the matrix filaments in each M layer having an average denier per filament of from about 6–20 and a tenacity of at least 2.0 gpd.; the matrix filaments in the X layer having an average denier per filament of from about 26 to 60 and a tenacity of at least 3.0 gpd, and which is at least 10% higher than the tenacity of the matrix filaments of the M layers, the filaments of the layered fabric being disposed in such a manner as to provide the following directionality values: MD/45° $\geq$ 1.5, XD/45° $\geq$ 1.5, and (MD + XD)/45° of 3.5 to 30, wherein XD is a measure of the total filament length of the layered fabric in the direction perpendicular to the fabric length direction, MD is a measure of the total filament length of the layered fabric in the fabric length direction and 45° is the average of the measures of the total filament length of the layered fabric in the directions at 45° to the fabric length direction, and wherein XD, MD and 45° are measures determined by the randometer method.

The nonwoven sheets of the present invention are bonded sufficiently to have a neckdown of from 1 to 5%, preferably from 1 to 3%. Prior to bonding, the matrix filaments of the M layers have a tenacity that is at least 2.2 g/den while those of the X layer have a tenacity of at least 3.3 g/den which is at least 10% higher than the filaments of the M layer. The binder fibers in the nonwoven sheet have an average break elongation of 400 to 800% which is indicative of low molecular orientation.

THE DRAWINGS

DETAILED DESCRIPTION OF THE INVENTION

Figure 1:
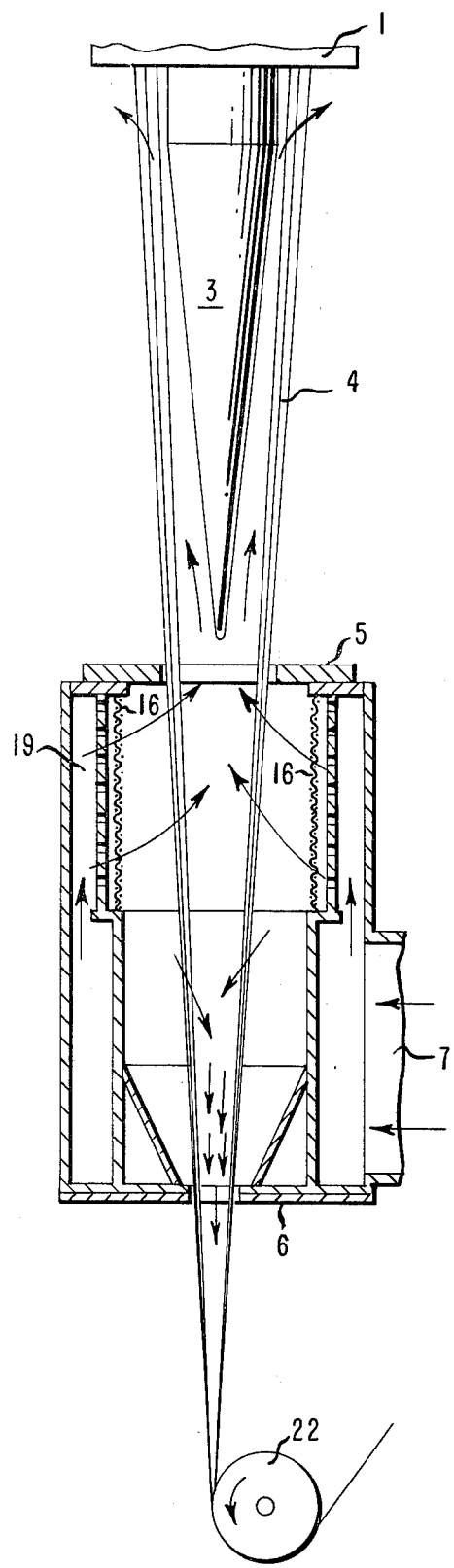
FIG. 1 is a schematic cross-sectional view of a melt spinning and quenching apparatus useful for preparing the high denier highly oriented, polypropylene filaments used in the nonwoven sheet of the invention.

The nonwoven fabric of the invention achieves the desired combination of properties in part by having high denier, (26 to 60 dpf), high tenacity matrix filaments, (at least 3.0 gpd) in the X layer. The filaments in the X layer have a tenacity that is at least 10% higher than that of the filaments in the M layers. Because of their higher molecular orientation, they are only moderately bonded as compared to filaments in the M layers and thus have greater mobility. It is believed that these mobile filaments are displaced rather than cut by the tufting needles. The high denier promotes resistance to tearing in the machine direction of the tufted carpets.

In the M layers of the nonwoven product of the invention are matrix filaments of low denier, (6–20 dpf) and moderate tenacity, (at least 2.0 gpd). These filaments have a moderate breaking strength and are less resistant to cutting by the needles. However, high resistance to cutting is not as critical in the M layers because the tufting needles move parallel to these filaments and are less likely to cut them. The moderately oriented matrix filaments are easily bonded to the binder filaments and to each other thereby providing high resistance to neckdown (without excessive bonding) as well as high fuzz resistance. Resistance to neckdown and to fuzzing are desirable for carpets exposed to beck dyeing. The relatively low denier of the filaments in the M layers also serves to improve optical cover of the layered sheet which is ordinarily from 2 to 4.5 oz/yd$^2$.

The binder filaments constituting from 10 to 35% by weight of each layer of the unbonded sheet have an average break elongation of 400 to 800% before bonding and after bonding consist of fused or partially fused polypropylene derived from filaments of low molecular orientation which are substantially melted in the bonding operation. The unbonded precursor sheet in essence contains filaments with three levels of molecular orientation: (1) low orientation in the binder of the M and X layers (2) moderate orientation in the matrix filaments of the M layers and (3) high orientation in the matrix filaments of the X layer. While the moderately oriented and highly oriented matrix filaments are not substantially altered by the hot bonding operation, the lowly oriented filaments are fused or partially fused.

The directionality of the fibers in the various layers is also important. An XD/45° (defined below) of less than 1.5 tends to lower the tufted tongue tear strength while an MD/45° of less than 1.5 tends to promote higher neckdown in tufting, dyeing or other hot processing. The value of (MD + XD)/45° should be from 3.5 to 30. The X layer should constitute from 40 to 60% by weight of the fabric and preferably each of the M layers should constitute from 20 to 30% by weight of the fabric. It has been found that the desired balance of neckdown and tufted tongue tear strength is not obtained when the X layer or the total of M layers is as high as 70% by weight.

For convenience in discussing the process, the layers may be indicated by a sequence of letters indicating the order of laydown with the first letter indicating the bottom layer of the sheet and so forth. Since the sheet may be observed from either side, only the relative placement of layers is important in characterizing the product. Using this description, MXM indicates a sheet prepared by successively depositing a machine direction layer, a cross-machine direction layer, and another machine direction layer. Obviously a large number of jets may be used across the width of a collecting belt to deposit a single M layer or X layer. In addition several banks of jets may be used in succession. If successive banks of jets deposit filaments in the same general direction, then the collected material may be considered to be a single layer.

A general description of the process is provided in Edwards, U.S. Pat. No. 3,563,838. An improved mechanism was used for melt spinning and quenching of the polypropylene filaments in the X-layer of the fabric of the present invention. In particular the flow of cooling air was carefully controlled to attain rapid cooling without unduly disrupting the threadline. The apparatus of FIG. 1 shows a modification of that in Fintel et al., U.S. Pat. No. 3,705,227. This apparatus may optionally be used for filaments in the M layers but is particularly useful for filaments in the X layer. In FIG. 1 melt spun polypropylene filaments 4 issue from spinneret plate 1 having orifices (not shown) set in a circular pattern and pass through a radial quench device 2 to a forwarding roll 22. An inverted cone air deflector 3 is attached to the spinneret plate. Flow restrictors 5 and 6 are provided at the upper and lower ends, respectively, of the quench device 2. In the particular modification which is provided for spinning the highly oriented high denier filaments, the flow restrictors are elliptical in shape and are so situated that a basically straight line (with only minor deflections) may be constructed from any point on the outer circle of spinneret orifices through a point on the innermost surface of flow restrictor 5 and similar point on flow restrictor 6 and finally to the first forwarding roll 22 in the filament drawing apparatus. At the same time the major axes of the elliptical surfaces of flow restrictors 5 and 6 lie in a plane which is tangential to the surface of the roll 22. This allows better conformance to the natural shape of the threadline. This particular construction of the apparatus of Fintel et al. permits exceptionally efficient quenching thereby avoiding filament sticking and promoting the formation of highly oriented high denier filaments at high spinning speeds.

The openings at the top and bottom of the quench device are sized such that the major resistance to flow occurs at the bottom end of the quench device, thereby forcing a major part of the quench air through the upper end of the quench apparatus. Quench air is admitted via inlet conduit 7 and distributed as hereinafter described so that it is directed radially inward against the filament threadline entering the quench chamber, thereafter the flow restrictors 5, 6 cause a major portion of the air to emerge from the upper end of the quench chamber 2 and to flow upward for a short period of time through the center of the hollow bundle of filaments 4. The air then meets the conical flow deflector 3 and is redirected radially outward through the threadline. The length of the conical flow deflector and the quench air flow rates to be used are dependent on many factors such as the number of filaments, throughput per hole, spinning temperature, etc.

A smoke removal device is normally employed in the melt spinning of polypropylene containing certain stabilizing additives which tend to sublime or decompose at the spinning temperature thus forming fumes at the spinneret face. This device also improves the quenching.

The filaments are passed down through a quenching chamber, the walls of which are formed from a cylindrical foraminous member 16. Plenum chamber 19 is supplied with air or other cooling gas through inlet 7 at a pressure slightly above atmospheric to provide a uniform radial flow of cooling gas into the quenching chamber through the foraminous member.

The bundle of filaments 4 passing from flow restrictor 6 is elliptically shaped with the major axis of the ellipse in a plane tangent to the surface of roll 22. In FIG. 1 the cross-sectional cut is taken along the minor axes of the ellipses at 5 and 6. The broadest axes of the ellipses are each parallel to the axis of roll 22.

Figure 2:
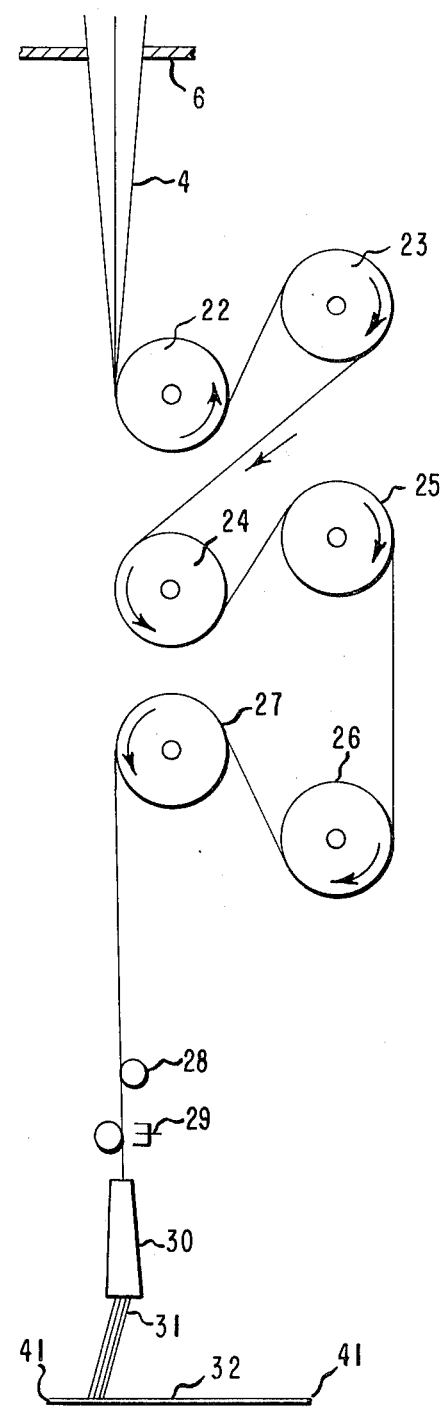
FIG. 2 is a schematic representation of an apparatus for drawing and depositing a ribbon of filaments on a moving belt.

Referring to FIG. 2 the elliptical bundle of filaments 4 becomes a ribbon of parallel filaments as it passes over roll 22. The yarn then travels successively to rolls 23, 24, 25, 26, and 27. The yarn travels at increasingly greater speed at each successive roll. The greatest speed increase is provided between designated hot rolls and the next succeeding cold roll. Drawing is assisted by heating the filaments or portions thereof at fluted roll 25 and when desired at smooth roll 23. Since roll 23 is a smooth cylindrical roll, uniform drawing is obtained between rolls 23 and 24. Roll 25, however, is a fluted roll and has grooves running along its surface in the axial direction. Segments of the yarn which touch the hot surface of the roll between grooves are drawn additionally but those segments suspended over the grooved portions are not drawn additionally to a significant degree. The filaments leaving roll 25 have alternate highly oriented and less oriented segments along their length. The ribbon of segment drawn filaments passes from roll 27 to guide 28. The filaments are electrostatically charged upon passing across the target bar of a corona charging device 29 such as that described in DiSabatino et al., U.S. Pat. No. 3,163,753. The ribbon of electrostatically charged continuous filaments is sucked into the entrance orifice of slot jet 30 (which is of the type shown in FIG. 6 of U.S. Pat. No. 3,563,838) and issues from the slot jet exit for deposition on moving belt 32. FIG. 2 is a view taken from the upstream end of the collecting belt 32. The sides 41 of the belt may, of course, be much farther apart when multiple jets are used. In FIG. 2 a ribbon of filaments 31 is deposited as an X layer. A pulse of air is supplied at the jet exit alternately from one side of the moving ribbon of filaments and then from the other to deflect the ribbon back and forth thereby laying down filaments predominantly aligned in the cross-machine direction but of course aligned also in other directions at the turn around points.

Figure 3:
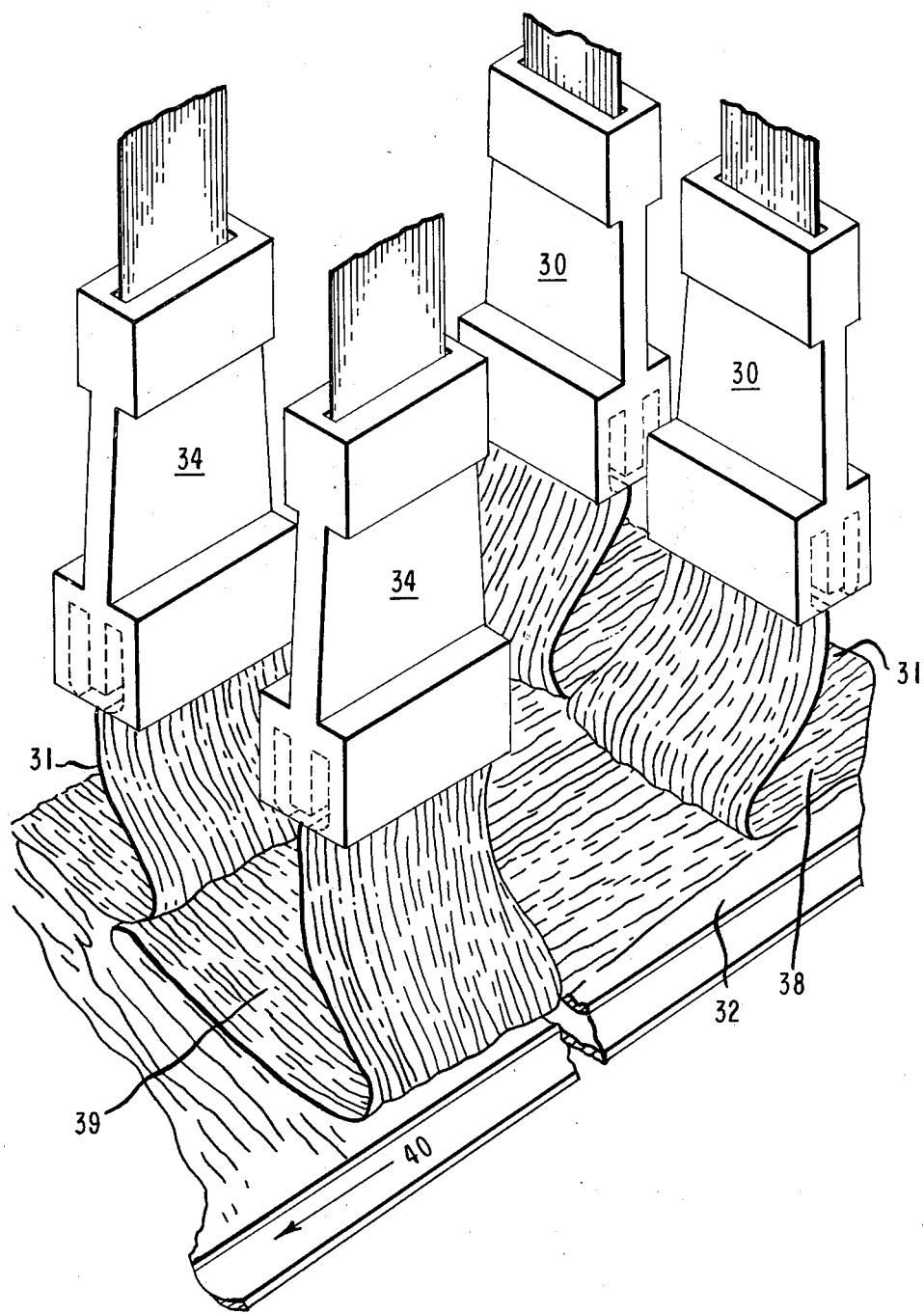
FIG. 3 is a perspective view of four air jet devices for deflecting filaments into layers each having a directionalized pattern.

The general arrangement of multiple forwarding jets over the collecting belt may be seen in FIG. 3 which shows four slot jets each forwarding a ribbon of filaments 31 to the porous collecting belt 32 moving in the direction shown by the arrow 40. The two upstream jets 30 are placed with the widest dimension of the slot oriented across the width of the collecting belt. The two downstream jets 34 are placed with the widest dimension of the slot oriented in the machine direction 40. The arrangement shown in FIG. 3 is for depositing layers in MX succession. For MXM laydown, another set of jets is provided downstream of jets 34 and these are oriented like jets 30.

It should be understood that a larger number of jets is provided across the width of the machine in commercial operation when large widths of carpet backing are being produced. For example, one could use 32 jets across the width for each layer M or X of the carpet backing.

The arrangement of filaments within the product of the invention may be seen in FIG. 3. Filaments in the M layer 38 are arranged generally in the machine direction. However, a portion of each filament is oriented in other directions because of the necessity for turnaround at each end of the traverse back and forth in the M direction. Similarly the filaments 39 in the X layer are generally oriented in the cross-machine direction but have portions of their length oriented in other directions.

In preparing products of the invention, filaments of relatively low denier are spun and drawn for depositing through the jet streams oscillating in the machine direction and filaments of high denier are spun and drawn for deposit by the jets oscillating in the cross direction. In addition the filaments which become the M layer are segmentally drawn to a lesser degree of molecular orientation than filaments for the X layer. The differences in denier per filament and molecular orientation for the drawn segments in the M and X layers are obtained by adjusting the extrusion speed, and adjusting the draw ratios between smooth rolls 23 and 24 and between fluted roll 25 and smooth roll 26. The amount of molecular orientation in the binder portion of the filament is primarily determined by the relative speeds of rolls 23 and 24. The percent binder for the M layers and X layers is determined by the ratio of depressed circumference to total circumference of the fluted roll.

The deposited filaments are thermally bonded preferably by passage through saturated steam using a bonder of the type described in Wyeth, U.S. Pat. No. 3,313,002. Excessive application of mechanical pressure should be avoided in using the bonder of U.S. Pat. No. 3,313,002 so that fiber mobility will be maintained in the X layer. It is particularly important to avoid excessive mechanical pressure when more than 20% binder is present in either of the outside M layers since the binder, when heated under pressure tends to fuse into the X layer thereby reducing fiber mobility. Fiber mobility is needed for promoting high cut pile tufted tear strength. In design of the sheet it should be understood that greater heat absorption occurs in the M layer closest to the steam supply. For this reason the fuzz ratings for the two sides of the sheet may differ even though the same amount of binder is used in each M layer. After bonding, a finish is applied to avoid excessive fiber breakage during tufting. The finish is preferably a polysiloxane as described in Jung, U.S. Pat. No. 3,322,607. Excessive shrinkage is avoided by restraining the sheet through bonding. The degree of bonding affects the properties of the nonwoven product. As bonding temperature increases, the neckdown of the tufted substrate decreases, and the tufted tongue tear value reaches a maximum and then decreases. A balance of neckdown and tufted tongue tear properties is needed for carpet backing. Desirable products have less than 5%, preferably less than 3% neckdown.

TEST METHODS

Directionality, Tufted Tongue Tear, Percent Neckdown, Binder Concentration and Matrix Fiber Denier, and Fiber Tenacity are measured as described in U.S. Pat. No. 3,821,062. Fiber tenacity can also be determined on filament samples taken directly from the jets and allowing for a 10% loss in tenacity in passing through the hot bonding operation.

Tufted Tear Cut Pile

For this test, a cut pile carpet is prepared, using bonded nonwoven fabric as the primary backing. The carpet is tufted with old worn needles. For this test the nonwoven fabric is lubricated with about 2% by weight of polymethylhydrogen siloxane. A sample of the lubricated sheet is cut from along its length (in the machine direction) to form strips 8 inches wide. These strips are mounted in a 5/32 gauge cut pile tufter (needles spaced 0.156 inch apart) such that one strip is tufted over a width of 6 inches by old needles (picked at random from a supply of needles used in the trade for approximately 1,000 hours). All needles are Eisbar 1269/350 with 0.125 inch shanks. The nonwoven sheet is tufted in the machine direction using a twisted nylon staple yarn (2 ply yarn made from singles with 2.25 worsted count) at 6.5 tufts/inch to provide a cut pile carpet with 0.500 inch pile height leaving 1 inch for untufted sheet on each side of the tufted portion. The tufted substrates with 1 inch selvage on each side are cut to prepare samples 20.3 cm. long (machine direction). The tufted tongue tear cut pile strength is then determined in the same manner as for loop pile, i.e., by tearing along the machine direction.

Fuzz Resistance

This test is a modification of ASTM Standard D 1375, Part C, Brush and Sponge Procedure. Samples are cut from the bonded nonwoven fabric to form square specimens 25.4 cm. long in the M direction and 25.4 cm. wide in the X direction. The specimens are wrapped around flat galvanized steel specimen holders which are rectangular in shape (10.8 cm. × 29.2 cm.). The holders are covered with 100 grit sandpaper to prevent specimen slippage during testing and the specimens are fastened to the holders by magnets. The total weight of the steel strip and magnet is 550 ± 5 grams. The specimens are then mounted face down on the upstanding bristles of the Pilling Tester, and the fuzz generating brush is run for 10 seconds underneath the specimens. The next step in the ASTM procedure, i.e., subjecting the fabric to a circular rubbing action with a sponge to roll the free fiber ends into pills, is eliminated. The appearance of the fabric is then evaluated by comparison with visual standards. A brush fuzz rating from 1 to 5 is given with 1 being extremely fuzzy and 5 being essentially free of fuzz.

Percent Optical Cover

This is a photometric test in which the covering power of test fabrics is quantified. Separate measurements are made of the amount of light reflected from a white background, black background, the test fabric in contact with the white background, and the identical section of test fabric in contact with the black background. Measurements are taken on at least five different sections of each test fabric. The commercially available device consists of a search unit (comprised of a light source, optical system, and photocells) connected by cable to an indicating meter, power supply, and controls. Percent optical cover is calculated using the reflectance measurements according to the following equation:

$$\text{Percent Optical Cover} = \left(1 - \frac{R_{FWB} - R_{FBB}}{R_{WB} - R_{BB}}\right) \times 100$$

where
$R_{WB}$ = reflectance from white background (calibrated to be 100 on the indicating meter)
$R_{BB}$ = reflectance from black background (calibrated to 0 on the indicating meter)
$R_{FWB}$ = reflectance from fabric on white background
$R_{FBB}$ = reflectance from fabric on black background.

Products of the invention have relatively high optical cover at a given basis weight compared to prior art products. For comparison the fabrics must be made from filaments having the same color depth and hue.

In the Examples which follow, an experimental apparatus was used which was similar to that described in FIGS. 1 and 2. The filament spinning, drawing and depositing operations for each example are given in Table 1.

In order to use already existing equipment, some of the filaments for this experimental work were sent to waste while the remainder were collected. In addition the amount of web deflection was adjusted in each experiment to provide a prescribed percent by weight of fiber in the M and X layers in the central areas used for sampling. The sampling areas were at the center of sheet width and included representative portions of each of the deposited M and X layers. Portions of the sheet near the side edges were not used for sampling.

EXAMPLES 1 TO 5

Five nonwoven products within the scope of the invention are described in Tables 2 and 3. Table 2 shows the various features of web construction and Table 3 shows properties of carpet backings and carpets.

Examples 1–5 were melt-spun from polypropylene having a melt flow rate of 3.2 ± 0.4 according to ASTM Method D 1238-65T. Each of these products contained a black pigment. The resulting products were gray in shade and the filaments were equivalent in depth and hue.

The MXM products of Examples 1–5 were made by depositing melt-spun polypropylene filaments from three spinnerets. Each spinneret fed a separate jet. The output of each spinneret was deposited in succession on a moving belt. First an M layer was applied at the upstream end of the collecting belt, then an X layer, then another M layer. The belt speed was adjusted to give products with the basis weight indicated in Table 3 under "Backing Weight".

Table 1 describes the spinning, drawing and depositing conditions. About 300 to 500 filaments were spun from each spinneret for the M layers and 150 to 300 for the X layers. The Table indicates the number of these spun filaments which were used in the nonwoven sheet after separation of excess filaments. The filaments which were to be used in the nonwoven web were separated from the other filaments just after they passed roll 27 in FIG. 2. Roll 25 was heated to about 135°–140° C. and was equipped with lands and grooves to provide segment drawn filaments, the least drawn segments being termed "binder".

Considering Table 2 each of the nonwoven webs from Examples 1 to 5 were constructed of high denier filaments in the X layer and low denier filaments in the M layers. The filaments in the X layer had higher orientation than the filaments in the M layers. The high orientation was reflected in the high filament tenacity.

The properties of carpet backings and carpets made from the webs of Table 2 are shown in Table 3. The products described in Table 2 were bonded by passing through steam bonding equipment described in Wyeth, U.S. Pat. No. 3,313,002. The collected filaments and the collecting belt passed directly through this bonder from the laydown area. The steam temperature in the bonder was adjusted to produce product with a neckdown of less than 5%. Neckdown was reduced by using higher temperatures. The temperature was kept low enough so that M and X layers could be separated by careful dissection and so that tufted tongue tear strength for the loop carpet was still at least 18 lbs.//oz./yd.$^2$. The temperatures used in this example were in the range 148° to 152° C. (When faster belt speeds are used, higher temperatures are required for adequate bonding.)

The carpet backings of Table 3 were used to prepare loop pile carpets and cut pile carpets as specified in the test methods. The carpets of the invention (Examples 1–5) had high tufted tear strength in loop pile carpets. In addition these backings were useful for making cut pile carpets and the backings were less sensitive to the quality of the tufting needles. Table 3 shows that the tufted cut pile carpets prepared with old needles had tufted tear strength above 45 lbs. This feature combined with high fuzz resistance and high cover in the backing material provided a very useful product.

filaments in the machine direction layers having an average denier per filament of from about 6–20 and a tenacity of at least 2.0 gpd; the matrix filaments in the cross-machine direction layer having an average denier per filament of from about 26 to 60 and a tenacity of at least 3.0 gpd, and which is at least 10% higher than the tenacity of the matrix filaments of the machine direction layers, the filaments of the layered fabric being disposed in such a manner as to provide the following directionality values; MD/45° ≥ 1.5, XD/45° ≥ 1.5 and (MD+XD)/45° of 3.5 to 30, wherein XD is a mea-

TABLE

PROCESS CONDITIONS FOR FILAMENT SPINNING, DRAWING AND DEPOSITING FOR EXAMPLES 1 to 5

| Example No. | Number of filaments collected per spinneret | | | Surface Speed of Roll 26, yds./min. | | Throughput to belt per spinneret, lbs./hr. | | Draw Ratio for Drawn Segments(a) | | Average Break Elongation(b) for Undrawn Segments, % | |
|---|---|---|---|---|---|---|---|---|---|---|---|
| | M | X | M | M-layers | X-layer | M-layers | X-layer | Ms | X | M-layers | X-layer |
| 1 | 200 | 150 | 200 | 723 | 588 | 17.5 | 35 | 1.8 | 3.5 | 466 | 595 |
| 2 | 200 | 100 | 200 | 723 | 707 | 17.5 | 35 | 1.8 | 4.0 | 481 | 551 |
| 3 | 200 | 150 | 200 | 553 | 588 | 17.5 | 35 | 1.8 | 3.6 | 478 | 577 |
| 4 | 200 | 150 | 200 | 553 | 541 | 17.5 | 35 | 1.8 | 3.3 | 524 | 637 |
| 5 | 200 | 150 | 200 | 723 | 588 | 17.5 | 35 | 1.8 | 3.5 | 516 | 561 |

(a)Draw ratio calculated from ratio of surface speed of Roll 26 to surface speed of Roll 22.
(b)Average elongation at break of heavy denier segments cut from filaments deposited on belt before bonding.

TABLE 2

NONWOVEN WEB CONSTRUCTION FOR EXAMPLES 1 TO 5

| Example No. | Web Construction | | | | | | | | | | | | Randometer Measurements | | |
|---|---|---|---|---|---|---|---|---|---|---|---|---|---|---|---|
| | % By Wt. in Layers | | | Denier per Filament(c) | | | Filament Ten., gpd(a)(c) | | | % Binder in Layers(b) | | | MD 45° | XD 45° | MX + XD 45° |
| | M | X | M | M | X | M | M | X | M | M | X | M | | | |
| 1 | 25 | 50 | 25 | 14.2 | 32.5 | 12.8 | 2.7 | 3.7 | 2.2 | 12 | 12 | 12 | 2.0 | 2.9 | 4.9 |
| 2 | 25 | 50 | 25 | 13.3 | 47.1 | 12.0 | 2.4 | 3.7 | 2.4 | 12 | 12 | 12 | 2.8 | 2.9 | 5.7 |
| 3 | 25 | 50 | 25 | 11.5 | 35.3 | 14.5 | 2.6 | 3.5 | 2.7 | 12 | 12 | 12 | 2.6 | 2.6 | 5.2 |
| 4 | 25 | 50 | 25 | 14.5 | 33.6 | 14.4 | 2.4 | 3.6 | 2.9 | 12 | 23 | 12 | 2.4 | 1.5 | 3.9 |
| 5 | 25 | 50 | 25 | 14.0 | 33.6 | 10.3 | 2.8 | 3.6 | 2.8 | 32 | 12 | 32 | 2.6 | 2.8 | 5.4 |

(a)Filament tenacities have been determined either from jet samples or bonded web samples. Values obtained from jet samples have been reduced 10% to simulate the effect of thermal bonding.

(b)Percent binder means here the percent by weight of undrawn segments in the filaments. These in turn are calculated from the formula:
$$\% \text{ undrawn} = \frac{\text{Total circumference of grooved portion of roll}}{\text{Total circumference of roll}} \times 100$$

(c)Matrix filaments

TABLE 3

PROPERTIES OF CARPET BACKINGS AND CARPETS OF EXAMPLES 1 TO 5

| Example No. | Tufted Tear, loop pile | | % Neckdown, loop pile | Tufted Tear, Cut pile, lbs. Worn needles | Fuzz Rating Of Layers | | Cover % | Backing Wgt., oz/yd² |
|---|---|---|---|---|---|---|---|---|
| | lbs. | lbs.//oz./yd² | | | F* | S** | | |
| 1 | 103 | 28 | 1.7 | 53 | 4.7 | 4.5 | 79 | 3.7 |
| 2 | 90 | 24 | 1.8 | 46 | 4.6 | 4.1 | 80 | 3.7 |
| 3 | 76 | 26 | 1.5 | 64 | 5.0 | 3.5 | 80 | 2.9 |
| 4 | 78 | 26 | 1.7 | 53 | 5.0 | 4.0 | 81 | 3.0 |
| 5 | 101 | 29 | 2.2 | 51 | 4.4 | 3.3 | 77 | 3.5 |

(a)Filaments contained 0.068 to 0.078% carbon black pigment.
*First layer exposed to steam
**Second layer exposed to steam

What is claimed is:

1. A length of layered nonwoven bonded continuous filament isotactic polypropylene fabric comprising a machine direction layer at each surface of the fabric with each of the two machine direction layers constituting from 20–30% of the fabric weight, and a cross-machine direction layer which constitutes from 40–60% of the fabric weight, each of the said layers consisting essentially of 65 to 90% by weight of matrix filament and 10 to 35% by weight of binder, the matrix filaments in the machine direction layers having an average denier per filament of from about 6–20 and a tenacity of at least 2.0 gpd; the matrix filaments in the cross-machine direction layer having an average denier per filament of from about 26 to 60 and a tenacity of at least 3.0 gpd, and which is at least 10% higher than the tenacity of the matrix filaments of the machine direction layers, the filaments of the layered fabric being disposed in such a manner as to provide the following directionality values; MD/45° ≥ 1.5, XD/45° ≥ 1.5 and (MD+XD)/45° of 3.5 to 30, wherein XD is a measure of the total filament length of the layered fabric in the direction perpendicular to the fabric length direction, MD is a measure of the total filament length of the layered fabric in the fabric length direction and 45° is the average of the measures of the total filament length of the layered fabric in the directions at 45° to the fabric length direction, and wherein XD, MD and 45° are measures determined by the randometer method, said fabric having a neckdown of 1 to 5%.

2. The fabric of claim 1 having a neckdown of 1 to 3%.

3. A length of layered nonwoven unbonded continuous filament isotactic polypropylene fabric comprising a machine direction layer at each surface of the fabric with each of the two machine direction layers constituting from 20–30% of the fabric weight, and a cross-machine direction layer which constitutes from 40–60% of the fabric weight, each of the said layers consisting essentially of from 65 to 90% by weight of matrix filaments and from 10 to 35% by weight of binder filaments having a break elongation of 400 to 800%, the matrix filaments in the machine direction layer having an average denier per filament of from about 6–20 and a tenacity of at least 2.2 gpd; the matrix filaments in the cross-machine direction layer having an average denier per filament of from about 26 to 60 and a tenacity of at least 3.3 gpd, and which is at least 10% higher than the tenacity of the matrix filaments of the machine direction layer, the filaments of the layered fabric being disposed in such a manner as to provide the following directionality values; MD/45° ≥ 1.5, XD/45° ≥ 1.5 and (MD+XD)/45° of 3.5 to 30, wherein XD is a measure of the total filament length of the layered fabric in the direction perpendicular to the fabric length direction, MD is a measure of the total filament length of the layered fabric in the fabric length direction and 45° is the average of the measures of the total filament length of the layered fabric in the directions at 45° to the fabric length direction, and wherein XD, MD and 45° are measures determined by the randometer method.

* * * * *